(12) United States Patent
Moriya et al.

(10) Patent No.: US 11,486,732 B2
(45) Date of Patent: Nov. 1, 2022

(54) EASILY ADJUSTABLE STROKE SENSOR AND METHOD FOR INSTALLING THE SAME

(71) Applicant: TDK Corporation, Tokyo (JP)

(72) Inventors: Takahiro Moriya, Tokyo (JP); Toshio Ishikawara, Tokyo (JP); Toshihiko Oyama, Tokyo (JP)

(73) Assignee: TDK Corporation, Tokyo (JP)

( * ) Notice: Subject to any disclaimer, the term of this patent is extended or adjusted under 35 U.S.C. 154(b) by 108 days.

(21) Appl. No.: 17/162,023

(22) Filed: Jan. 29, 2021

(65) Prior Publication Data

US 2021/0262829 A1 Aug. 26, 2021

(30) Foreign Application Priority Data

Feb. 21, 2020 (JP) .............................. JP2020-027997

(51) Int. Cl.
*G01B 7/14* (2006.01)
*G01D 5/14* (2006.01)
(Continued)

(52) U.S. Cl.
CPC .............. *G01D 5/14* (2013.01); *G01B 7/003* (2013.01); *G01D 5/145* (2013.01); *G01D 5/2013* (2013.01);
(Continued)

(58) Field of Classification Search
CPC .......... G01D 5/14; G01D 18/00; G01D 11/30; G01D 5/12; G01D 11/00; G01D 5/145;
(Continued)

(56) References Cited

U.S. PATENT DOCUMENTS

| 2009/0051353 A1* | 2/2009 | Takeya ................. G01R 33/093 |
| | | 324/207.21 |
| 2013/0106404 A1 | 5/2013 | Mizutani et al. |

(Continued)

FOREIGN PATENT DOCUMENTS

| JP | 2013-096847 A | 5/2013 |
| JP | 2014-095615 A | 5/2014 |

(Continued)

*Primary Examiner* — Raul J Rios Russo
(74) *Attorney, Agent, or Firm* — Posz Law Group, PLC (57) ABSTRACT

A method for installing a stroke sensor is provided such that the stroke sensor can be easily adjusted using a simple process.
The method has the steps of; obtaining a relationship between the magnetic field and the indicator value while moving the magnet in the first direction relative to the magnetic field detecting element within a predetermined relative movable range, and writing the relationship in the processor; after the relationship is written in the processor, preventing the predetermined relative movable range from being shifted in the first direction by means of a jig for preventing positional shift, wherein the jig includes an element that fixes relative positions between the magnetic field detecting element and the magnet; attaching the magnet and the magnetic field detecting element, which have been prevented from being shifted, to different structures that are movable in the first direction relative to each other, and removing the jig.

17 Claims, 9 Drawing Sheets

(51) Int. Cl.
  G01B 7/00     (2006.01)
  G01D 5/48     (2006.01)
  G01D 5/20     (2006.01)
  *G01D 18/00*     (2006.01)
  *B60T 7/04*      (2006.01)
  *G01B 7/02*      (2006.01)

(52) U.S. Cl.
  CPC .............. *G01D 5/485* (2013.01); *B60T 7/042* (2013.01); *B60T 2270/82* (2013.01); *G01B 7/02* (2013.01); *G01B 7/14* (2013.01); *G01D 18/00* (2013.01)

(58) Field of Classification Search
  CPC ...... G01D 5/485; G01D 5/2013; G01B 7/003; G01B 7/02; G01B 7/14; B60T 7/042; B60T 2270/82; B60T 2220/04
  USPC ................... 324/51, 55, 200, 207.11, 207.24
  See application file for complete search history.

(56) References Cited

U.S. PATENT DOCUMENTS

2021/0247172 A1\* 8/2021 Moriya .................. G01B 7/003
2022/0214154 A1\* 7/2022 Moriya .................. G01B 7/003

FOREIGN PATENT DOCUMENTS

| JP | 2016-011834 A | 1/2016 |
| JP | 6044599 B2 | 12/2016 |

\* cited by examiner

EASILY ADJUSTABLE STROKE SENSOR AND METHOD FOR INSTALLING THE SAME

CROSS REFERENCE TO RELATED APPLICATION

The present application is based on, and claims priority from, JP2020-27997, filed on Feb. 21, 2020, the disclosure of which is hereby incorporated by reference herein in its entirety.

1. TECHNICAL FIELD

The present invention relates to a stroke sensor, a method for installing the same, a method for manufacturing a brake system and a system that includes the stroke sensor.

2. BACKGROUND

A stroke sensor is used in various kinds of fields, such as an automobile transmission and a brake of a vehicle. A stroke sensor includes a magnetic field detecting element that detects a magnetic field and a magnet that generates a magnetic field that is detected by the magnetic field detecting element. The magnet is moved relative to the magnetic field detecting element. A stroke sensor outputs a voltage that indicates the position of the magnet relative to the magnetic field detecting element. When a stroke sensor is installed in an actual apparatus, the magnet is moved relative to the magnetic field detecting element in advance in order to obtain the relationship between the magnetic field and the output voltage. In order to realize the relationship in an actual apparatus again, it is necessary to prevent the positional shift between the magnet and the magnetic field detecting element when these elements are installed in the actual apparatus. JP6044599 discloses a sensor having a light generating section, a light detecting section, and a light scale that is positioned between the generating section and the detecting section. The light generating section and the light detecting section need to face each other in accordance with a predetermined positional relationship. To this end, the light generating unit and the light detecting unit are mounted on a flexible substrate, and the flexible substrate is bent such that the light generating unit and the light detecting unit face each other in accordance with the predetermined positional relationship.

According to the method for preventing positional shift described in JP6044599, the light generating portion and the light detecting portion are mounted on a flexible substrate. Therefore, this method cannot be applied to a stroke sensor in which a magnetic field detecting element and a magnet are attached to different structures that are moved relative to each other.

SUMMARY

The present invention aims at providing a method for installing a stroke sensor such that the stroke sensor can be easily adjusted using a simple process.

The method relates to a stroke sensor comprising: a magnetic field detecting element that detects a magnetic field; a magnet that generates the magnetic field and that is movable in a first direction relative to the magnetic field detecting element; and a processor that outputs an indicator value based on the magnetic field that is detected by the magnetic field detecting element, wherein the indicator value indicates a position of the magnet relative to the magnetic field detecting element, The method comprises the steps of; obtaining a relationship between the magnetic field and the indicator value while moving the magnet in the first direction relative to the magnetic field detecting element within a predetermined relative movable range, and writing the relationship in the processor; after the relationship is written in the processor, preventing the predetermined relative movable range from being shifted in the first direction by means of a jig for preventing positional shift, wherein the jig includes an element that fixes relative positions between the magnetic field detecting element and the magnet; attaching the magnet and the magnetic field detecting element, which have been prevented from being shifted, to different structures that are movable in the first direction relative to each other, and removing the jig.

According to the present invention, it is possible to provide a method for installing a stroke sensor such that the stroke sensor can be easily adjusted using a simple process.

The above and other objects, features and advantages of the present invention will become apparent from the following description with reference to the accompanying drawings which illustrate examples of the present invention.

BRIEF DESCRIPTION OF THE DRAWINGS

FIG. 5A-5H are views showing a method for calibrating the stroke sensor and installing the stroke sensor in an actual apparatus;

DETAILED DESCRIPTION

With reference to the drawings, a method for installing stroke sensor 1 according to an embodiment of the present invention will be described. In the following descriptions, the direction in which magnet 3 is moved is referred to as a first direction or the X direction. The direction that is perpendicular to the X direction and that is perpendicular to the surface of magnet 3 that faces magnetic field detecting element 21 is referred to as the Y direction. The term "relative position" or "relative position of magnet 3" refers to the position of magnet 3 in the X direction relative to magnetic field detecting element 21 unless otherwise defined.

Figure 1A:
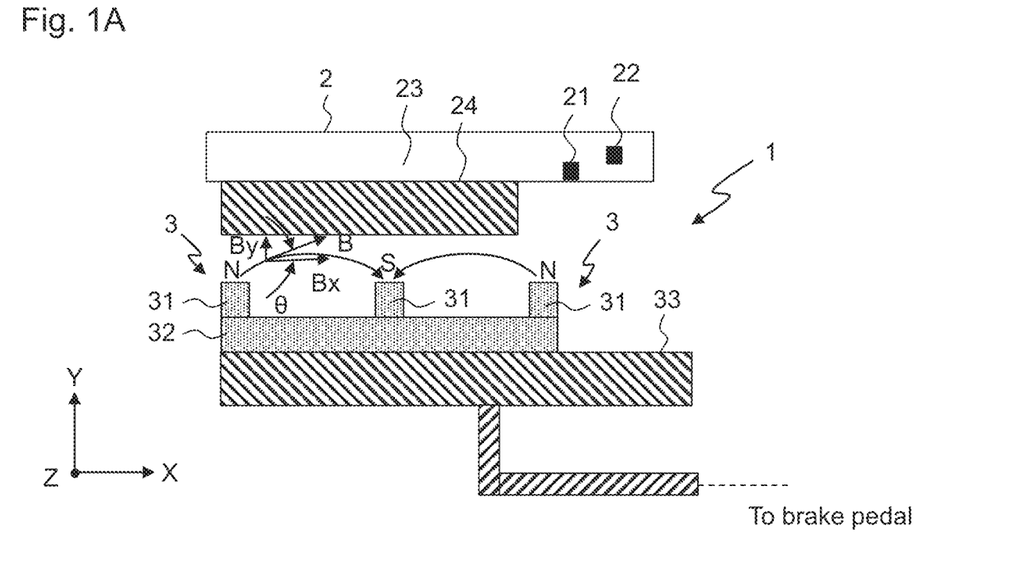
FIGS. 1A to 1B are schematic views showing the arrangement of a stroke sensor according to an embodiment of the present invention.
Figure 1B:
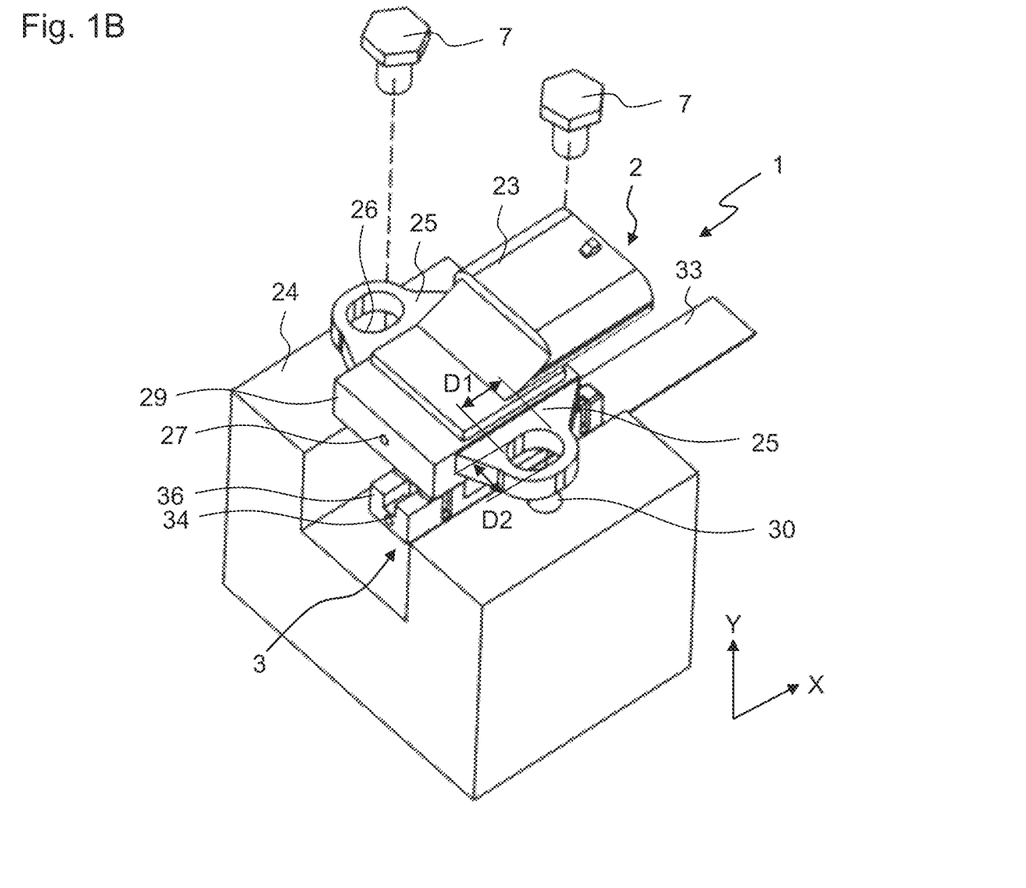

FIG. 1A shows a schematic view of stroke sensor 1 that is installed in a vehicle or the like, and FIG. 1B shows a schematic exploded perspective view. Stroke sensor 1 has sensor assembly 2 that includes magnetic field detecting element 21 that detects a magnetic field and processor 22, as well as magnet 3 that generates a magnetic field that is detected by magnetic field detecting element 21. Magnet 3 includes three sub-magnets 31 that are aligned in the X direction at the same interval and yolk 32 that connects sub-magnets 31 to each other. The N pole and the S pole are alternately arranged on the surfaces of three sub-magnets 31 that face magnetic field detecting element 21. Magnet 3 is supported on first structure 33, such as a support plate, by means of screws (not illustrated), and first structure 33 is connected to a movable element, such as a brake pedal (not illustrated). Magnet 3 is movable in the X direction relative to sensor assembly 2, that is, magnetic field detecting element 21. It is possible to detect, for example, the amount of depression of a brake pedal by detecting the position of magnet 3 relative to magnetic field detecting element 21. A stopper (not illustrated) may be provided in order to delimit the movable range of first structure 33 in the X direction.

Sensor assembly 2 is attached to second structure 24 that is different from first structure 33. Second structure 24 is movable in the X direction relative to first structure 33. Sensor assembly 2 has housing 23 that supports magnetic field detecting element 21 and processor 22. Magnetic field detecting element 21 is arranged on the surface of housing 23 that faces magnet 3. If second structure 24 has a space for magnetic field detecting element 21 and processor 22, then housing 23 may be omitted. Magnetic field detecting element 21 includes an element that detects a magnetic field in the X direction and an element that detects a magnetic field in the Y direction (both not illustrated). The type of these elements is not limited, and a Hall element, a TMR element, a GMR element and so on may be used. Sensor assembly 2 is preferably immobile because a power cable, an output cable and the like are connected to sensor assembly 2. Accordingly, sensor assembly 2 is immobile, and magnet 3 is movable in the present embodiment. However, sensor assembly 2 may be movable, and magnet 3 may be immobile. Sensor assembly 2 has a pair of collars 25 that are fixed to second structure 24. Each collar 25 has mounting hole 26 through which screw 7 is inserted. Screw 7 fixes sensor assembly 2 to second structure 24. Threaded hole 30 that screw 7 engages is formed in second structure 24. Mounting hole 26 is a slot that is elongate in the first direction (i.e., dimension D1 in the first direction is larger than dimension D2 in the direction perpendicular to the first direction). Thus, it is possible to adjust the position of sensor assembly 2 in the X direction relative to second structure 24. Furthermore, threaded hole 27 that screw 4A engages is formed on end surface 29 of sensor assembly 2 in the X direction. Threaded hole 34 that screw 4B engages is formed on end surface 36 of magnet 3 in the X direction.

Processor 22 calculates and outputs indicator value S that indicates the relative position of magnet 3 based on the magnetic field that is detected by magnetic field detecting element 21. Three sub-magnets 31 generate a magnetic flux having a substantially sinusoidal shape across them. Assume that the X component and the Y component of a magnetic flux at a certain position is Bx and By, respectively. Then, angle θ of the magnetic flux relative to the X direction at the position (hereinafter, referred to as angle θ of the magnetic field) can be expressed by arctan (By/Bx). The magnetic field around magnet 3 can be obtained by analysis etc. in advance. Since the gap between magnetic field detecting element 21 and magnet 3 in the Y direction is known, if angle θ of the magnetic field is obtained, then the relative position of magnet 3 can be calculated. Processor 22 calculates angle θ of the magnetic field=arctan (By/Bx) from Bx and By that are detected by magnetic field detecting element 21, converts angle θ of the magnetic field to output voltage V that corresponds to the relative position, and outputs output voltage V. Angle θ of the magnetic field can be detected over the angle range of 0 to 360°. Therefore, indicator value S is output voltage V that is determined based on angle θ of the magnetic field.

Figure 2A:
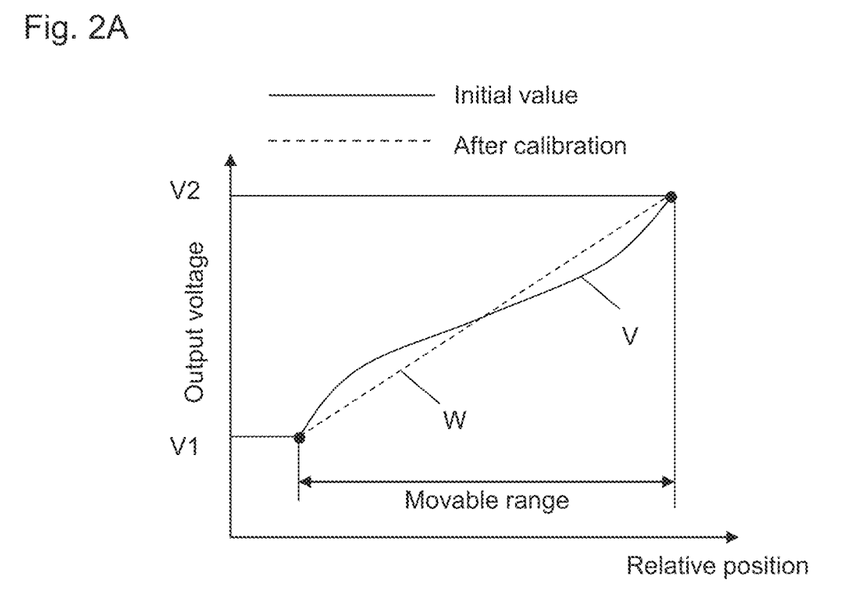
FIGS. 2A to 2B are conceptual views showing the relationship between the relative position of a magnet of the stroke sensor and the output voltage.

The relationship between the relative position and output voltage V is typically curvilinear and can be expressed by a curved line that resembles a cubic function, as shown by the solid line in FIG. 2A. Accordingly, before stroke sensor 1 is installed in an actual apparatus, calibration to convert the relationship between the relative position and output voltage V to a linear relationship is performed for each stroke sensor 1. The method for the calibration will be now described.

First, magnet 3 and sensor assembly 2 are attached to calibration apparatus 6 (see FIGS. 4 and 5A to 5E). Calibration apparatus 6 has first support structure 33C that simulates first structure 33 to which magnet 3 is attached, and second support structure 24C that simulates second structure 24 to which sensor assembly 2 is attached. Calibration apparatus 6 has substantially the same configuration as the actual apparatus that is shown in FIG. 1 except for error factors, such as manufacturing error. Calibration apparatus 6 calculates angle θ of the magnetic field=arctan (By/Bx) while moving magnet 3 in the X direction relative to sensor assembly 2, converts angle θ of the magnetic field to output voltage V that corresponds to the relative position, and outputs output voltage V. The relationship between the relative position and output voltage V is expressed by the solid line in FIG. 2A.

Figure 3:
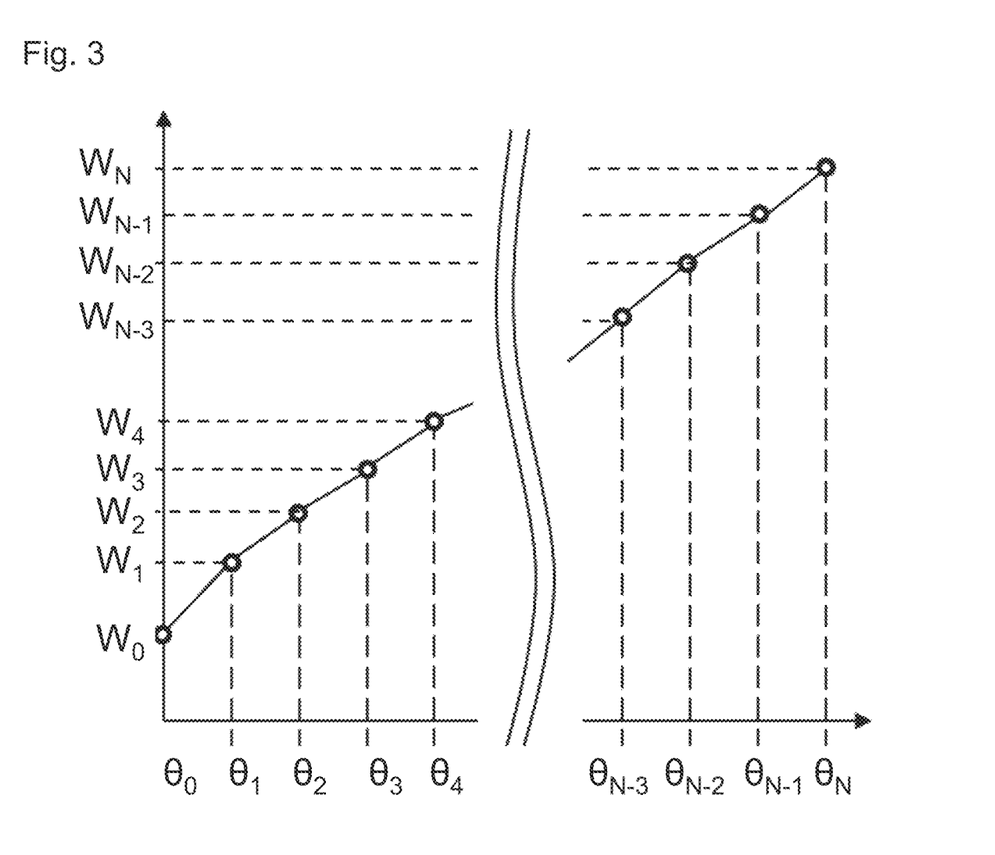
FIG. 3 is an example of a conversion formula used for the calibration of the stroke sensor.

Next, a line that connects output voltages V1 and V2 at both ends of the movable range is calculated. The line is regarded as the relationship formula between the relative position and output voltage V that has been calibrated (hereinafter, referred to as output voltage W). The relationship formula between the relative position and output voltage W is a linear function. In order to obtain the relationship formula, processor 22 has converting means that converts angle θ of the magnetic field to output voltage W. The converting means are generated as a conversion map shown in FIG. 3. For convenience, the converting means are shown by a graph in FIG. 3, but the converting means are actually stored as a table in the memory of processor 22. Conversion map is generated as a set of $\theta_0, \theta_1, \theta_2, \ldots, \theta_{N-2}, \theta_{N-1}, \theta_N$ versus output voltage $W_0, W_1, W_2, \ldots, W_{N-2}, W_{N-1}, W_N$ (where $\Delta\theta=\theta_i-\theta_{i-1}=360°/N$) (N is a natural number). N is selected, for example, from a range between 30 and 40. In the present embodiment, the converting means convert angle θ of the magnetic field to output voltage W, but output voltage V may be converted to output voltage W. In this manner, in the calibration, the relationship between the magnetic field and the indicator values is obtained while moving magnet 3 in the X direction relative to magnetic field detecting element 21 within a predetermined relative movable range, and the relationship is written in processor 22.

Stroke sensor 1 works in the following manner. Magnetic field detecting element 21 of sensor assembly 2 detects Bx and By. Processor 22 calculates angle θ of the magnetic field=arctan (By/Bx). Processor 22 converts angle θ of the magnetic field to output voltage W, that corresponds to the relative position, by means of the converting means, and outputs output voltage W. Angle θ of the magnetic field is calculated from the conversion map by interpolation, as needed. In this manner, stroke sensor 1 outputs output voltage W that is in a linear relationship with the relative position of the magnet 3.

However, there is a possibility that when magnet 3 is attached to first structure 33 and sensor assembly 2 that has been calibrated is attached to second structure 24, the relationship between the relative position and output voltage W, that is, the relationship shown by the dashed line in FIG. 2A will not be maintained. For example, due to the manufacturing tolerance both first structure 33 and second structure 24 have, the positions of magnet 3 and sensor assembly 2 may be relatively shifted in the X direction. The positional shift may also occur when magnet 3 is attached to first structure 33 or when sensor assembly 2 is attached to second structure 24. The positions of sensor assembly 2 and magnet 3 may also deviate when these are attached by an adhesive and the like.

Figure 2B:
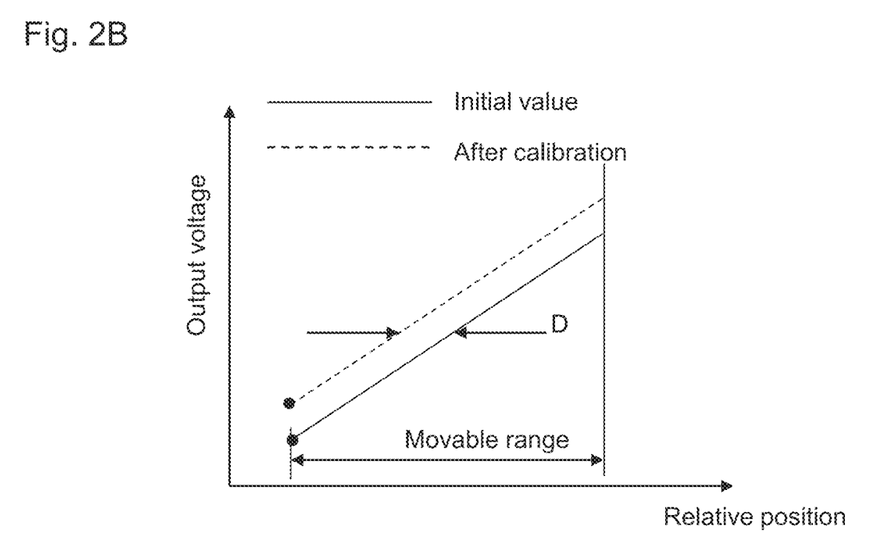
Figure 4:
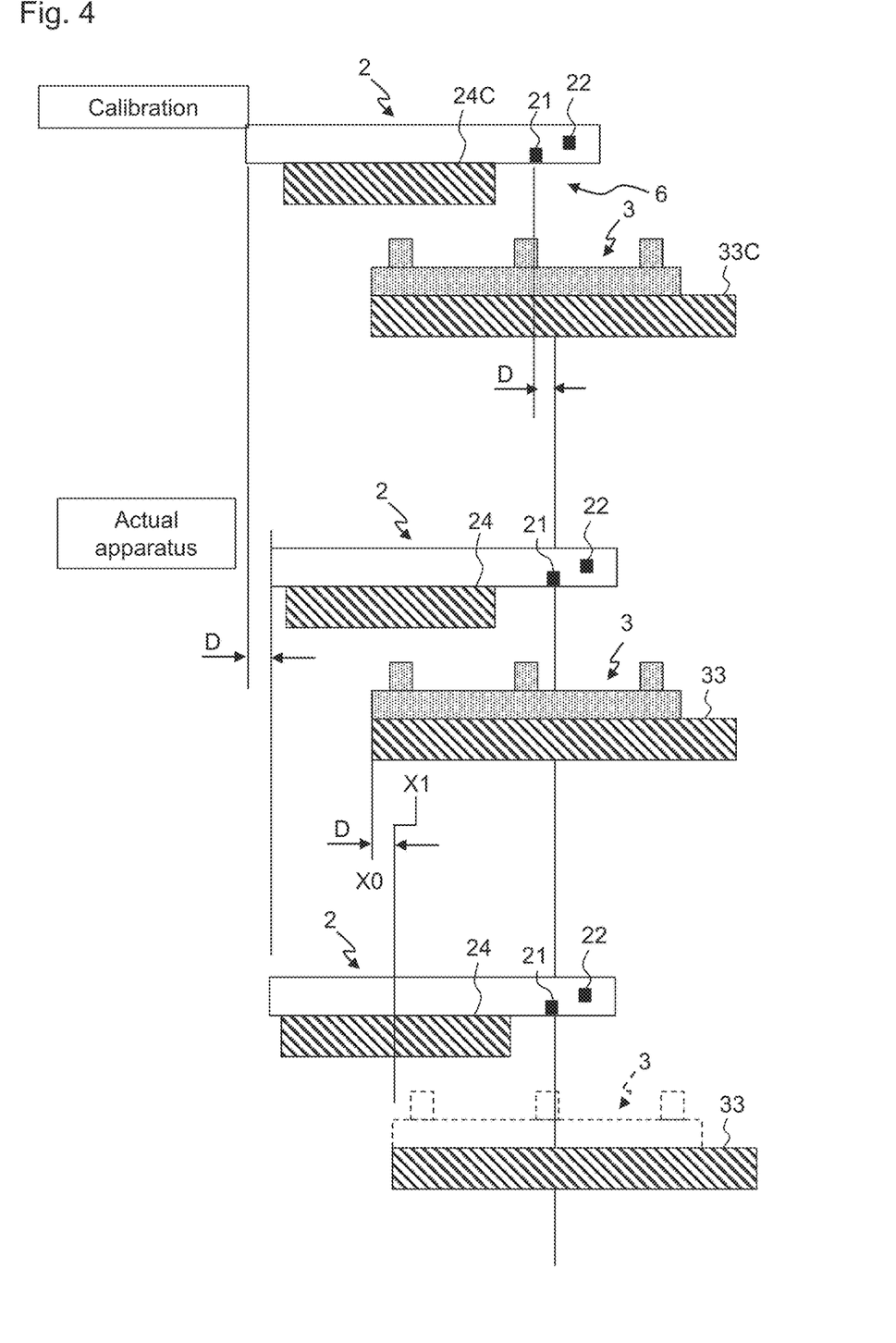
FIG. 4 is a view illustrating the influence of the positional shift on the measurement accuracy.

FIG. 4 conceptually illustrates the influence of the positional shift on the measurement accuracy. As shown in the upper part in FIG. 4, assume that the calibration has been performed when sensor assembly 2 is attached to second support 24C at a predetermined position thereof. On the other hand, in an actual apparatus shown in the middle part in FIG. 4, sensor assembly 2 is attached to second structure 24 at a rightward shifted position. Magnet 3 is attached at the same position as in the calibration. That is, the position of sensor assembly 2 relative to magnet 3 after the installation in the actual apparatus is shifted from the position in the calibration by distance D. In this case, sensor assembly 2 that has been installed in the actual apparatus recognizes that magnet 3 at the position in the middle part in FIG. 4 is positioned as shown by the dashed line in the bottom part in FIG. 4. That is, sensor assembly 2 recognizes that magnet 3 is shifted rightward from the actual position by distance D. In other words, when the end of magnet 3 is at position X1 that is shifted rightward from position X0 by distance D, sensor assembly 2 outputs output voltage W that is to be outputted when the end of magnet 3 is at position X0. As a result, the output line is translated by distance D, as shown in FIG. 2B, and the measurement accuracy of stroke sensor 1 worsens. It should be noted that the position of sensor assembly 2 relative to magnet 3 after the installation in the actual apparatus and the position of sensor assembly 2 relative to magnet 3 in the calibration may be shifted from each other in the Z direction (the direction perpendicular to both the X direction and the Y direction in FIG. 1). However, the Z direction is not a direction in which stroke sensor 1 detects a position, and the distribution of the magnetic field does not largely vary in the Z direction. Therefore, the positional shift in the Z direction does not largely affect the measurement accuracy. The measurement error in the Z direction is smaller, on the level of one digit, than the measurement error that is caused by the positional shift on the same level as in the X direction. The measurement error when the position of sensor assembly 2 relative to magnet 3 after the installation in the actual apparatus and the position of sensor assembly 2 relative to magnet 3 in the calibration may be shifted from each other in the Y direction is about the same level as the measurement error that is caused by the positional shift in the Z direction.

In other words, the above-mentioned problem means that the predetermined relative movable range during the calibration is shifted in the X direction when stroke sensor 1 is installed in an actual apparatus. For example, if a range of ±10 mm centering on magnetic field detecting element 21 is the predetermined relative movable range in the calibration, and magnetic field detecting element 21 is attached with 1 mm shift on the positive side, then a range of −11 mm to 9 mm centering on magnetic field detecting element 21 will be the actual relative movable range. That is, the predetermined relative movable range is shifted 1 mm on the negative side. Therefore, in the present embodiment, in order to prevent the positional shift, calibration of stroke sensor 1 and installation of stroke sensor 1 in an actual apparatus are performed in the following manner.

Figure 5A:
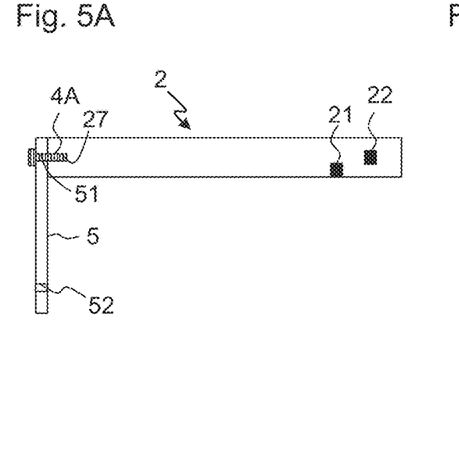
Figure 5B:
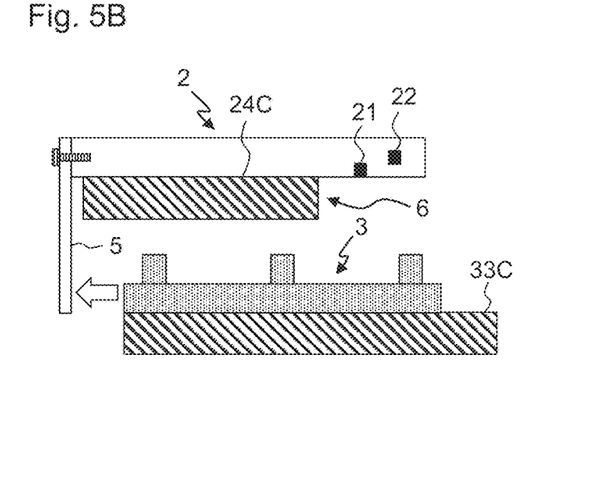
Figure 5C:
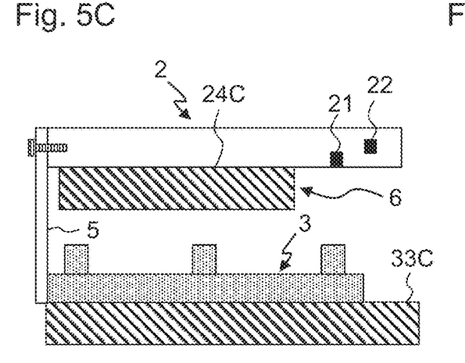
Figure 5D:
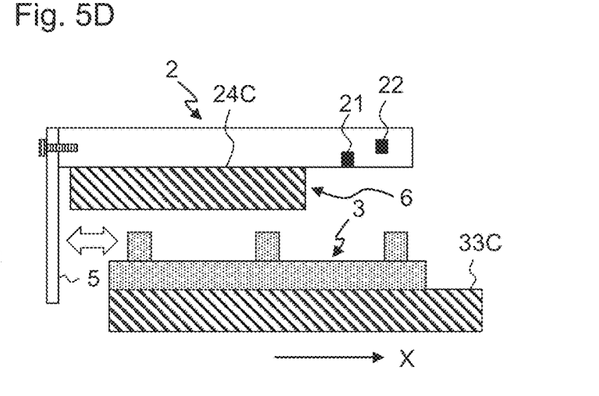

First, prior to the calibration, fixing member 5 is attached to the end surface of sensor assembly 2, as shown in FIG. 5A. Fixing element 5 is a plate having upper hole 51 and lower hole 52 through which screws 4A, 4B are inserted, respectively. In order to avoid influencing the calibration, fixing member 5 is preferably made of a non-magnetic material, but the material is not particularly limited, and metal, resin and the like may be used. Fixing element 5 is temporarily fixed to sensor assembly 2 by inserting screw 4A through upper hole 51 and by engaging screw 4A with threaded hole 27. The lower half of fixing member 5 overlaps with the movable range of magnet 3. Next, as shown in FIG. 5B, sensor assembly 2 and magnet 3 are attached to calibration apparatus 6. Specifically, sensor assembly 2 is attached to second support structure 24C that simulates second structure 24, and magnet 3 is attached to first support structure 33C that simulates first structure 33. Next, as shown in FIG. 5C, by moving first support structure 33C, magnet 3 is moved in the X direction until magnet 3 abuts against fixing member 5. Next, as shown in FIG. 5D, calibration is performed by setting the abutting position where magnet 3 abuts against fixing member 5 to be an end of a predetermined relative movable range, and the relationship between angle θ of the magnetic field and output voltage W is obtained. At this stage, since fixing member 5 is not fixed to magnet 3, magnet 3 can be freely moved relative to sensor assembly 2.

Figure 5E:
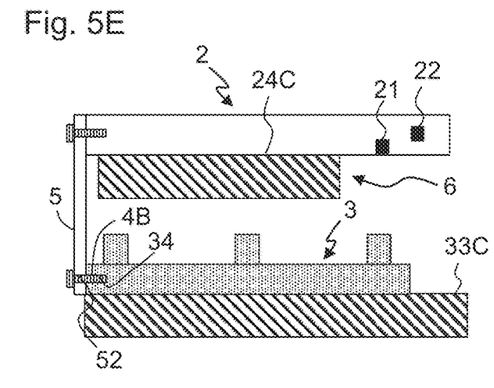
Figure 5F:
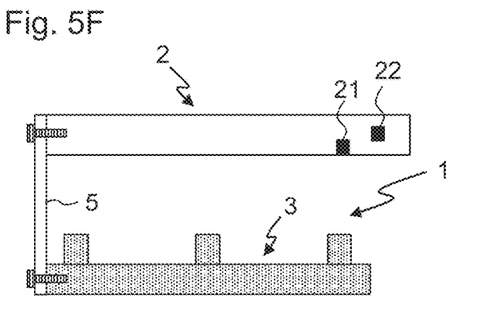

Next, as shown in FIG. 5E, magnet 3 is moved until magnet 3 abuts against fixing member 5 again, and fixing member 5 is attached to the end surface of magnet 3 at the abutting position. Fixing element 5 is temporarily fixed to magnet 3 by inserting screw 4B through lower hole 52 of fixing member 5 and by engaging screw 4B with threaded hole 34. Fixing element 5 is attached to the end surfaces of magnet 3 and sensor assembly 2 on the same side in relation to the X direction. Since the positioning of sensor assembly 2 and magnet 3 in the X direction is performed by magnet 3 abutting against fixing member 5, the positioning accuracy can be easily ensured. In addition, the configuration of fixing member 5 is simplified. Next, as shown in FIG. 5F, stroke sensor 1 to which fixing member 5 has been attached is removed from calibration apparatus 6.

Figure 5G:
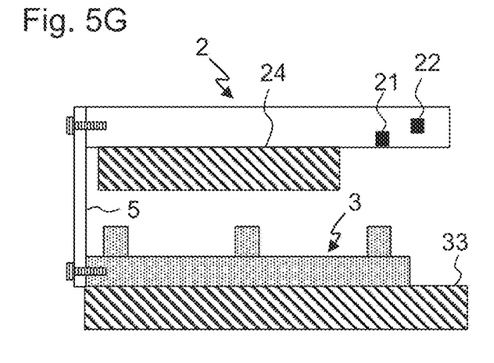

Next, as shown in FIG. 5G, stroke sensor 1 to which fixing member 5 has been attached is installed in an actual apparatus. First, magnet 3 is fixed to first structure 33. Sensor assembly 2 is then fixed to second structure 24. As described above, since mounting hole 26 of sensor assembly 2 is a slot that is elongate in the X direction, sensor assembly 2 can be fixed to second structure 24 by means of screw 7 while fixing member 5 is attached.

Figure 5H:
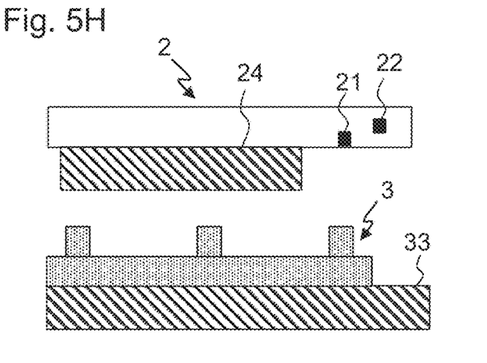
Figure 6:
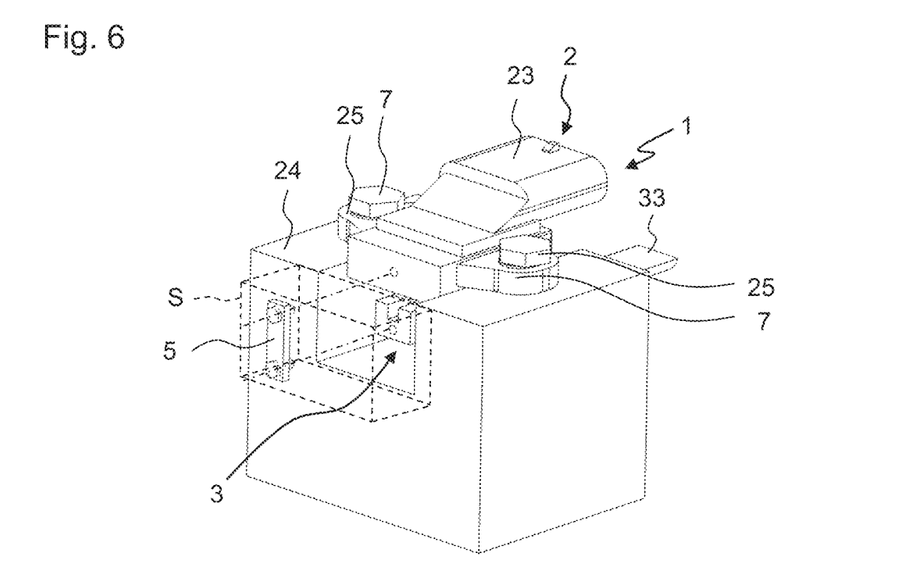
FIG. 6 is a perspective view of the stroke sensor and a fixing member.

Thereafter, as shown in FIG. 5H, fixing member 5 is removed. FIG. 6 shows a perspective view of stroke sensor 1 and fixing member 5.

In this manner, according to the present embodiment, the predetermined relative movable range in the X direction is prevented from being shifted by means of fixing member 5. Sensor assembly 2 and magnet 3 free of the positional shift are then attached to different structures 24, 33 that are movable in the X direction relative to each other, and then means for preventing the positional shift or a jig for preventing the positional shift are removed. The means for preventing positional shift or the jig for preventing the positional shift include an element that fixes relative positions between magnetic field detecting element 21 and magnet 3, that is, fixing member 5 that abuts against sensor assembly 2 and magnet 3, as well as temporary fixing means that temporarily fix fixing member 5 to sensor assembly 2 and magnet 3. The temporary fixing means are screws 4A, 4B, but fixing member 5 may be temporarily fixed to sensor assembly 2 and magnet 3, for example, by snap fitting.

In the present embodiment, automatic and precise positioning of sensor assembly 2 is performed by positioning magnet 3 when stroke sensor 1 is attached to an actual apparatus. All that is needed to do after first magnet 3 and sensor assembly 2 are installed in an actual apparatus is to remove fixing member 5. In general, the calibration of stroke sensor 1 is performed by the manufacturer of stroke sensor 1, but the adjustment of stroke sensor 1 after it is installed in an actual apparatus is performed by the manufacturer of the assembly to which stroke sensor 1 is incorporated or by the manufacturer of the final product. In the present embodiment, since adjustment of stroke sensor 1 is not required after installation in an actual apparatus, the process that is performed by the manufacturer of the assembly or the final product is simplified and added value of stroke sensor 1 is increased.

As mentioned above, the environment in which sensor assembly 2 and magnet 3 are attached to an actual apparatus is different from the environment in which sensor assembly 2 and magnet 3 are attached to calibration apparatus 6. In the environment in which sensor assembly 2 and magnet 3 are attached to an actual apparatus, a space for arranging and removing the means for preventing the positional shift or the jig for preventing the positional shift is required. To this end, space S having a predetermined size (see FIG. 6) is preferably formed in the vicinity of the surfaces of second structure 24 and magnet 3 that face the same direction. Space S is determined by taking consideration into the space for arranging fixing member 5, as well as the space for removing screws 4A, 4B and the space for arranging tools for removing screws 4A, 4B.

In the present embodiment, a highly precise calibration can be performed even when magnet 3 is only movable to limited positions, i.e., only discretely movable. For example, first structure 33 may be connected to an element, such as a plunger, that is configured only to stop at both ends of the movable range. When calibration of stroke sensor 1 is performed after stroke sensor 1 is installed in an actual apparatus, the measurements that can be used for the calibration are limited to the values that are measured at the two points. In the present embodiment, since the calibration can be performed using measurements at multiple points before stroke sensor 1 is installed in an actual apparatus, the accuracy of the calibration can be improved.

Figure 7:
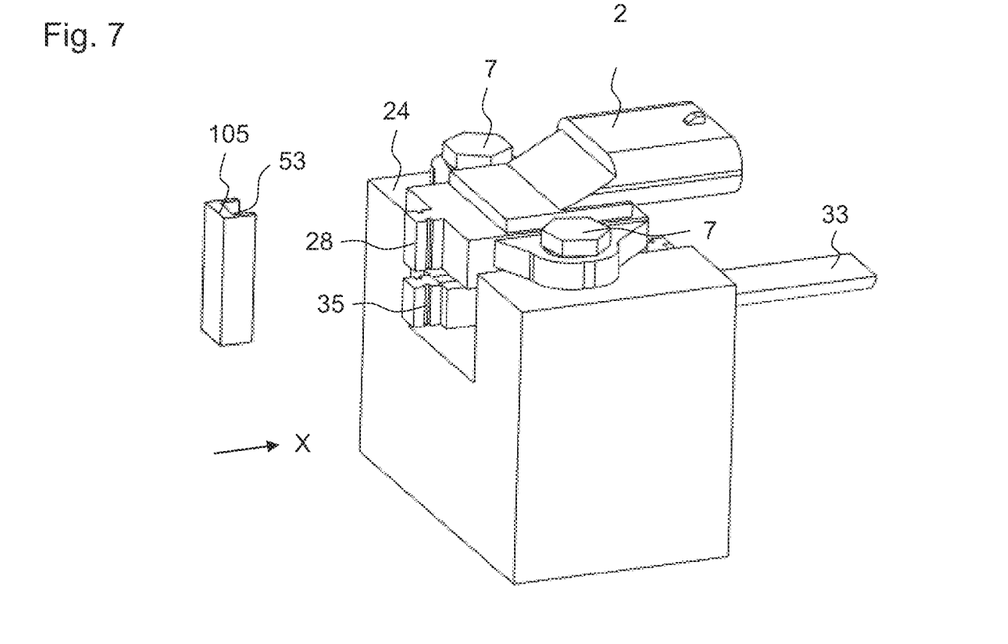
FIGS. 7 to 9 are schematic views showing the arrangement of stroke sensors according to various modifications.

An embodiment of the present invention has been described above, but the present invention is not limited to the present embodiment. For example, as shown in FIG. 7, fixing member 105 may have rotation preventing section 53 that prevents sensor assembly 2 and magnet 3 from rotating about axes that are parallel to the X direction. Rotation preventing section 53 is first engaging portion 53 that is formed on the surface of fixing member 5 that faces magnet 3 and sensor assembly 2. Sensor assembly 2 and magnet 3 have second engaging portions 28, 35 that engage first engaging portion 53, respectively. First engaging portion 53 is a groove, and second engaging portions 28, 35 are ridges that engage the groove, but first engaging portion 53 may be a ridge, and second engaging portions 28, 35 may be grooves.

Figure 8:
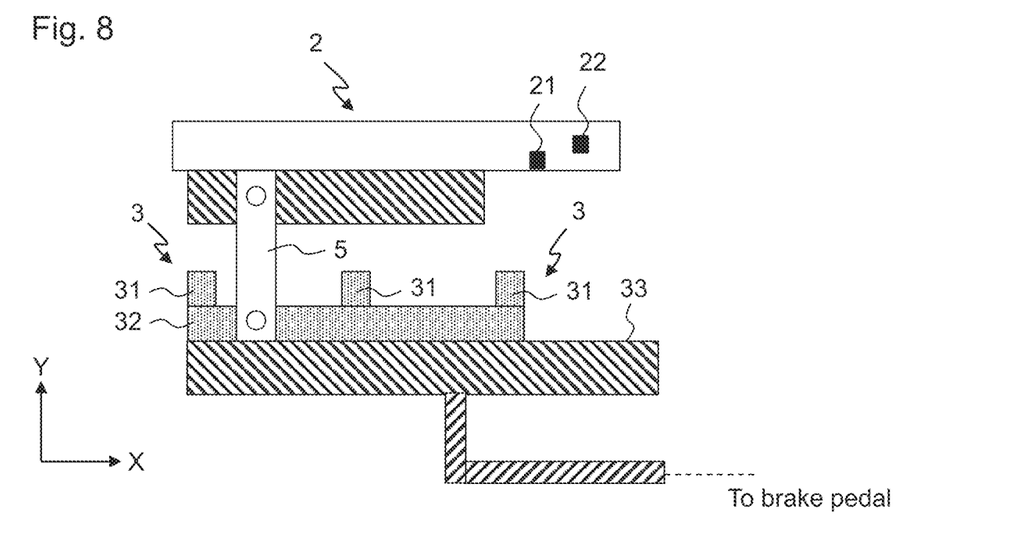

As shown in FIG. 8, fixing member 5 may be fixed to the side surfaces of sensor assembly 2 and magnet 3. If a space for attaching element 5 is present on the side of sensor assembly 2 and magnet 3, it may be advantageous to fix fixing member 5 to the side surfaces of sensor assembly 2 and magnet 3.

Figure 9:
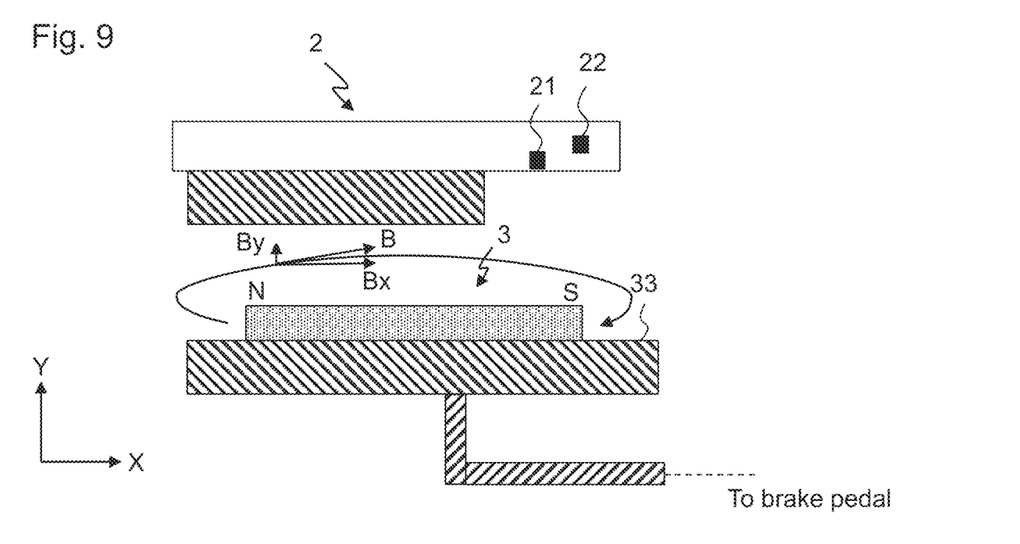

As shown in FIG. 9, magnet 3 may be a single magnet. The intensity of magnetic flux By in the Y direction that is detected by magnetic field detecting element 21 changes depending on the relative position of magnet 3.

Accordingly, the intensity of magnetic flux By can be used as an indicator value of the relative position of magnet 3. In other words, in this modification, indicator value S is an output voltage that is determined based on the intensity of a magnetic field.

In addition, the calibration may be omitted. As shown in FIG. 2A, it is preferable for the output characteristics of stroke sensor 1 to linearize the relationship between the relative position and the output voltage by the calibration, but the linearization is not essential. Omitting the calibration leads to simplification of the production process.

Figure 10:
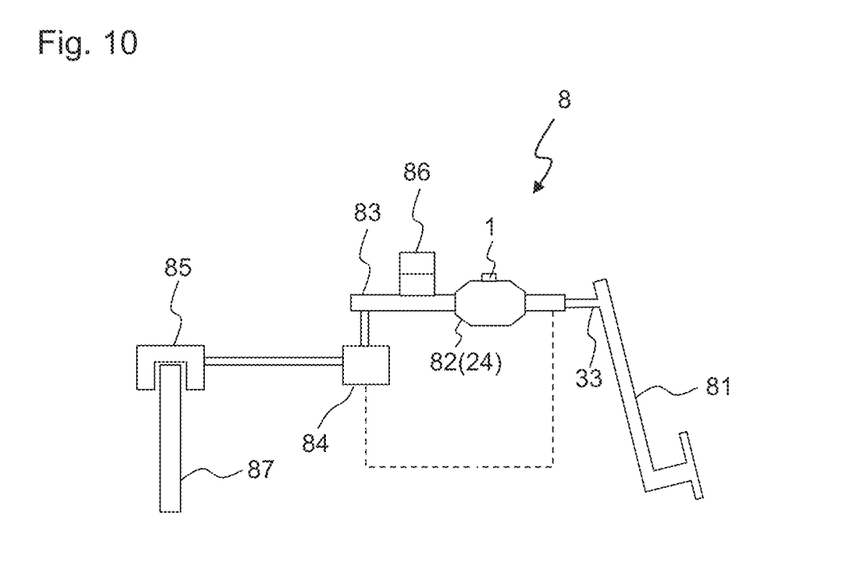
FIG. 10 is a schematic view showing the arrangement of a brake system that includes the stroke sensor of the embodiment.

As an example of an apparatus or a system that uses stroke sensor 1 mentioned above, FIG. 10 shows brake system 8. Brake system 8 has brake pedal 81, booster 82 that is connected to brake pedal 81 via first structure 33, master cylinder 83 that is connected to booster 82, hydraulic control circuit 84 that is connected to master cylinder 83, and caliper 85 that is connected to hydraulic control circuit 84. Reservoir tank 86 is connected to master cylinder 83. Stroke sensor 1 is fixed to booster 82, and second structure 24 is booster 82. Stroke sensor 1 may be fixed to a vehicle body, but the adjustment of stroke sensor 1 can be completed within brake system 8 by fixing stroke sensor 1 to booster 82. Braking force that is inputted from brake pedal 81 is amplified by booster 82 and is transmitted to hydraulic control circuit 84. The amount of depression of brake pedal 81 that is detected by stroke sensor 1 is also transmitted to hydraulic control circuit 84. Hydraulic control circuit 84 supplies brake oil to caliper 85 depending on the amount of depression of brake pedal 81. Brake system 8 is manufactured as follows. First, stroke sensor 1 is prepared. Stroke sensor 1 has been adjusted by the method described above, and fixing member 5 has been attached to stroke sensor 1. Next, brake system 8 is assembled except for stroke sensor 1. Next, magnet 3 is attached to first structure 33, and sensor assembly 2 is attached to booster 82 (second structure 24). Thereafter, fixing member 5 is removed from first structure 33 and booster 82.

Although a certain preferred embodiment of the present invention has been shown and described in detail, it should be understood that various changes and modifications may be made without departing from the spirit or scope of the appended claims.

What is claimed is:

1. A method for installing a stroke sensor, the stroke sensor comprising:
    a magnetic field detecting element that detects a magnetic field;
    a magnet that generates the magnetic field and that is movable in a first direction relative to the magnetic field detecting element; and
    a processor that outputs an indicator value based on the magnetic field that is detected by the magnetic field detecting element, wherein the indicator value indicates a position of the magnet relative to the magnetic field detecting element,
    the method comprising the steps of;

obtaining a relationship between the magnetic field and the indicator value while moving the magnet in the first direction relative to the magnetic field is detecting element within a predetermined relative movable ramie; and writing the relationship in the processor;

after the relationship is written in the processor, preventing the predetermined relative movable ramie from being shifted in the first direction by means of a jig for preventing positional shift, wherein the jig includes an element that fixes relative positions between the magnetic field detecting element and the magnet;

attaching the magnet and the magnetic field detecting element, which have been prevented from being shifted, to different structures that are movable in the first direction relative to each other, and removing the jig.

2. The method according to claim 1; wherein the jig includes:

a fixing member that abuts against a sensor assembly and the magnet, wherein the sensor assembly includes the magnetic field detecting element;

and temporary fixing means that temporarily fix the fixing member both to the sensor assembly and to the magnet.

3. The method according to claim 2; wherein the fixing member is attached to an end surface of the sensor assembly and an end surface of the magnet, wherein both end surfaces face a same direction in the first direction.

4. The method according to claim 3, wherein, the fixing member is attached to the end surface of the sensor assembly, the magnet is then moved until the magnet abuts against the fixing member, and the relationship is then obtained by setting an abutting position to be one end of the predetermined relative movable range, wherein the abutting position is a position where the magnet abuts against the fixing member, and after the relationship is written in the processor, the magnet is moved to abut against the fixing member again, and the magnet is fixed to the fixing member at the abutting position.

5. The method according to claim 2, wherein the fixing member is a plate and the temporary fixing means are a screw.

6. The method according to claim 2, wherein the fixing member has a rotation preventing section that prevents the sensor assembly and the magnet is from rotating about axes that are parallel to the first direction.

7. The method according to claim 6, wherein the rotation preventing section is a first engaging portion that the fixing member has, and the sensor assembly and the magnet each have a second engaging portion that engages the first engaging portion.

8. The method according to claim 2, wherein the fixing member is non-magnetic.

9. The method according to claim 1, wherein the sensor assembly has a collar that is fixed to the structure, the collar has a hole through which a screw for fixing the sensor assembly to the structure is inserted, and the hole is a slit that is elongate in the first direction.

10. The method according to claim 1, wherein the relationship is expressed by a linear function.

11. The method according to claim 1, wherein the indicator value is an output voltage of the stroke sensor, wherein the output voltage is based on an angle of the magnetic field, wherein the angle is obtained from the magnetic field that is detected by the magnetic field detecting element.

12. The method according to claim 1, wherein the indicator value is an output voltage of the stroke sensor, wherein the output voltage is based on intensity of the magnetic field; wherein the intensity is obtained from the magnetic field that is detected by the magnetic field detecting element.

13. A method for manufacturing a brake system comprising the method according to claim 1, wherein the different structures are a first structure and a booster; and the first structure is connected to a brake pedal, the method comprising the steps of:

attaching the magnet to the first structure, wherein the jig is attached to the magnet; and attaching the magnetic field detecting element to the booster, wherein the jig is attached to the magnetic field detecting element.

14. A stroke sensor comprising:

a magnetic field detecting element that detects a magnetic field;

a magnet that generates the magnetic field and that is movable in a first direction relative to the magnetic field detecting element; and a processor that outputs an indicator value based on the magnetic field that is detected by the magnetic field detecting element, wherein the indicator value indicates a position of the magnet relative to the magnetic field detecting element, wherein, the magnet and the magnetic field detecting element can be attached to different structures that are movable in the first direction relative to each other such that the magnet is movable in the first direction relative to the magnetic field detecting element within a predetermined relative movable range, and a relationship between the magnetic field and the indicator value is written in the processor, the stroke sensor further comprising a jig for preventing positional shift, wherein the jig includes an element that prevents the predetermined relative movable range from being shifted in the first direction when the magnet and the magnetic field detecting element are attached to the different structures; and the element can be removed after the magnet and the magnetic field detecting element are attached to the different structures.

15. A system having a stroke sensor, comprising;

a first structure;

a magnet that is attached to the first structure and that generates a magnetic field;

a second structure that is movable in a first direction relative to the first structure; and a magnetic field detecting element that is attached to the second structure and that detects the magnetic field, wherein, the magnet and the magnetic field detecting element are attached to the first structure and the second structure, respectively, such that the magnet is movable in the first direction relative to the magnetic field detecting element within a predetermined relative movable range, and a space is formed in a vicinity of surfaces of the second structure and the magnet, the surfaces facing a same direction.

16. The system according to claim 15, wherein the space enables a jig for preventing positional shift to be arranged and removed, wherein the jig prevents the predetermined relative movable range from being deviated in the first direction when the magnetic field detecting element and the magnet are attached to the first structure and the second structure, respectively.

17. A method for installing a stroke sensor, the stroke sensor comprising:
- a magnetic field detecting element that detects a magnetic field;
- a magnet that generates the magnetic field and that is movable in a first direction relative to the magnetic field detecting element; and
- a processor that outputs an indicator value based on the magnetic field that is detected by the magnetic field detecting element, wherein the indicator value indicates a position of the magnet relative to the magnetic field detecting element, the method comprising the steps of;
- obtaining a relationship between the magnetic field and the indicator value while moving the magnet in the first direction relative to the magnetic field detecting element within a predetermined relative movable range, and writing the relationship in the processor;
- after the relationship is written in the processor, preventing the predetermined relative movable range from being shifted in the first direction by means of means for preventing positional shift;
- attaching the magnet and the magnetic field detecting element, which have been prevented from being shifted, to different structures that are movable in the first direction relative to each other, and removing the means for preventing positional shift.

* * * * *